Jan. 5, 1937.  H. P. CHANDLER  2,066,766
LUBRICATING DEVICE
Filed May 20, 1936

Inventor
HOMER P. CHANDLER.
By
Attor͞

Patented Jan. 5, 1937

2,066,766

UNITED STATES PATENT OFFICE 2,066,766

LUBRICATING DEVICE

Homer P. Chandler, Mansfield, Ohio, assignor to The Ohio Brass Company, Mansfield, Ohio, a corporation of New Jersey Application May 20, 1936, Serial No. 80,760

8 Claims. (Cl. 184—15)

My invention relates to a device for lubricating trolley wires.

The object of my invention is to provide a simple and efficient device which may be attached to a vehicle and which will automatically lubricate the trolley wire as the vehicle moves with the device in contact with the trolley wire.

My invention resides in the new construction, combination and relation of the parts herein described and shown in the accompanying drawing.

Figure 1:
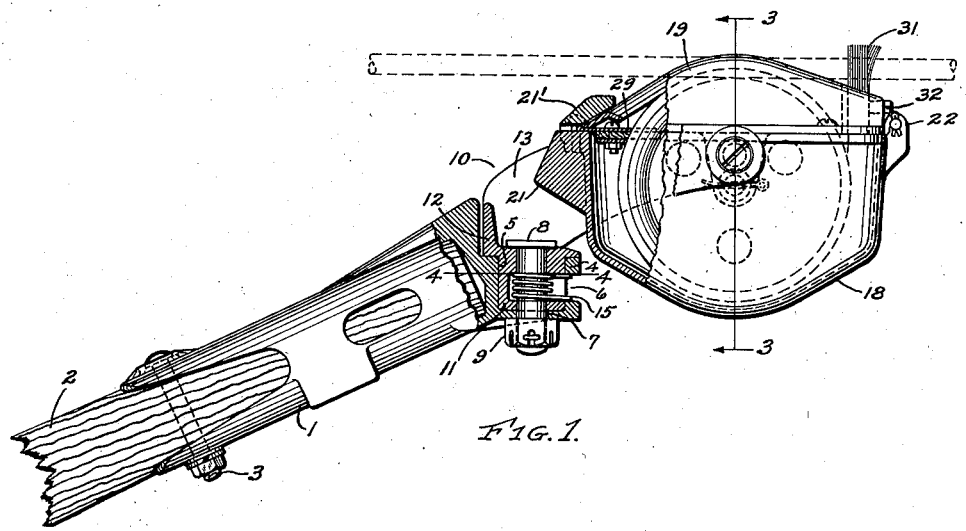
Fig. 1 is a side view in partial section of my invention.
Figure 2:
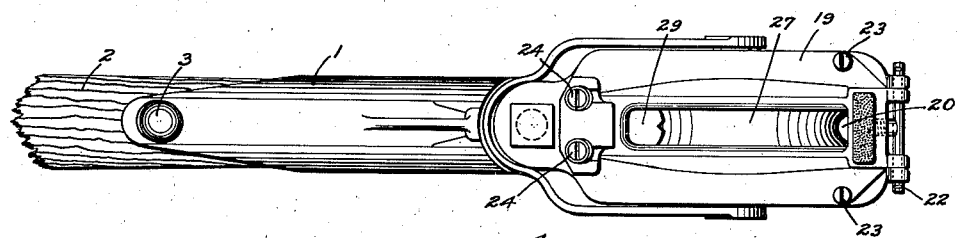
Fig. 2 is a top view of my invention.
Figure 3:
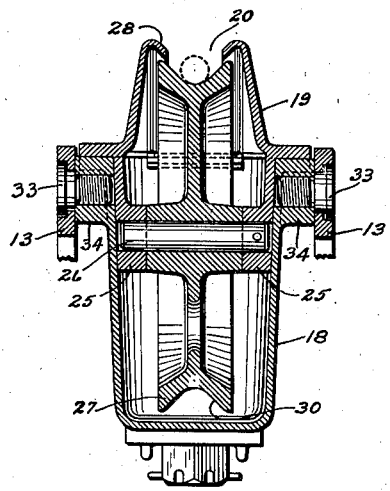
Fig. 3 is a transverse section on the line 3—3 of Fig. 1.
Figure 4:
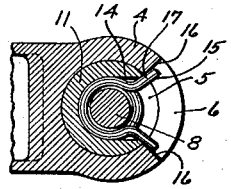
Fig. 4 is a transverse section on the line 4—4 of Fig. 1 showing a complete section of the hinged support.

In the preferred embodiment of my invention I provide a socketed support member 1 adapted to receive a trolley pole or support 2 which may be either of metal or wood, or other suitable material and the parts are secured together by means of the thru bolt and nut 3.

The free end of the member 1 is provided with a socket 4 having a recess 5 and a side slot 6, and an opening 7 through which projects the pin 8 provided with the castellated nut 9.

Mounted on the free end of the member 1 is a support 10 having a projection 11 positioned in the recess 5 and a flange portion 12 mounted on the socket member 4 and the spaced arms 13. The member 11 is provided with registering openings through which projects the pin 8. The member 11 is also provided with a recess 14 in which is mounted a coil spring 15 under tension and having its ends contact with the side faces 16 of the member 4.

The above described construction provides a pivotal joint under tension of the spring 15 tending at all times to maintain the arms 13 in alignment with the members 1 and 2. If the arms 13 are thrown out of alignment one of the free ends 17 of the member 11 would tend to further coil the spring and increase the tension therein thus increasing the tension toward realigning the member 10 with the members 1 and 2.

Positioned between the free ends of the arms 13 is a receptacle 18 which is pivotally supported by the arms. The receptacle is supported between its extreme ends and above its center of gravity. The receptacle is provided with a cover 19 having a slotted opening 20.

The receptacle is provided with a stop 21 which will engage with the head of the bolt 8 if the receptacle tends to rotate too far in one direction as might particularly be the case if the vehicle should move backward with the device in contact with the trolley wire. The device is also provided with a stop member 21' which may engage with the trolley wire to prevent too great rotation of the receptacle 18 when the vehicle moves in the forward direction with the device in contact with the trolley wire. The members 21 and 21' act as limit stops of the device when in operation.

The cover 19 is hinged to the receptacle 18 by means of the pintle 22 but is held in closed position normally by the screws 23 and 24. The screws 24 also hold the member 22 in position.

The cover has depending arms 25 in the free ends of which is positioned a pintle 26 upon which is rotatably mounted the grooved wheel 27 which dips into the lubricating material held in the receptacle and applies the material to and distributes it along the trolley wire. The cover 19 is also provided with the overhanging lips 28 which tend to catch any lubricating material tending to be thrown from the wheel 27 by centrifugal force.

It will be appreciated that in order to renew the wheel or replenish the lubricant in the receptacle, it is only necessary to remove the screws 23 and 24 and tip the cover 19 back about the pintle 22. The lubricant can then be placed in the receptacle, or the pintle 26 removed and a new wheel mounted in position.

In order to regulate the amount of lubricant which is applied to the wire, I provide a rubber 29 which bears against the faces of the groove 30 in the wheel 27 thus removing excess lubricant which would otherwise be carried upwardly by the wheel and be deposited on the wire. I also at the trailing end of the cover mount a brush 31 held in place by means of the screw 32. This brush will become saturated with the lubricant and as it is yielding and contacts with the sides of the trolley wire, it will tend to better distribute the lubricant more uniformly and over a greater surface of the wire than would be accomplished by the wheel 27 alone.

Studs 33 extending through the arms 13 and screwing into the bosses 34 of the receptacle pivotally support the receptacle in position.

It should be noted that the wheel 27 is mounted at a point below the axis of the studs 33 therefore bringing the greater part of weight of the receptacle and attached parts considerably below the axis of the studs 33, thus tending to better balance the receptacle 18 and avoid the necessity of springs.

It will further be noted that my invention is much simpler, therefore, much less costly than other forms of lubricators.

Having disclosed my invention, I claim:—

1. A trolley wire lubricating device comprising a socketed support, a forked member mounted on the support, a spring interposed between the support and member tending to hold the parts in alignment, a receptacle adapted to hold a lubricant and mounted between the free ends of the forked member to pivot in a vertical plane, a member mounted to rotate within the receptacle and having a portion exposed to engage the trolley wire, stops to limit the rotation of the receptacle when the device is in operation and means depending within the receptacle from the cover to support the rotating member.

2. A trolley wire coating device comprising a socketed support, a forked member mounted on the support, a spring interposed between the support and member tending to hold the parts in alignment, a substantially closed receptacle adapted to hold a fluid and mounted between the free ends of the forked member, means engaging the receptacle on its opposite sides at points between the ends of the receptacle to support the receptacle in pivotal relation to the forked member, a member mounted to rotate within the receptacle and having a portion exposed to engage the trolley wire and means positioned below the axis of the first said means to support the rotating member.

3. A trolley wire coating device comprising a receptacle to hold a fluid, means to support the receptacle, means interlocked with the support and the receptacle to secure the receptacle to the support in pivotal relation thereto, a cover for the receptacle hinged to the receptacle and having a slot, a member rotatably mounted within the receptacle and engageable with a trolley wire through the slot in the cover and means depending from the cover to support the rotatable member at a point below said interlocking means.

4. A trolley wire coating device comprising a receptacle to hold a fluid, means to support the receptacle in pivotal relation thereto, a cover for the receptacle hinged to the receptacle and having an elongated slot, means depending within the receptacle from the cover, a rotatable member mounted on the depending means and engageable by a trolley wire through the said slot, the axis of the rotatable member being below the axis through the pivotal point of the receptacle.

5. A trolley wire coating device comprising a receptacle to hold a fluid, means to support the receptacle in pivotal relation thereto, a cover for the receptacle having an elongated slot, means depending within the receptacle from the cover, a rotatable member mounted on the depending means and engageable by a trolley wire through the said slot, the axis of the rotatable member being below the axis through the pivotal point of the receptacle.

6. A trolley wire coating device comprising a receptacle to hold a fluid, means to support the receptacle in pivotal relation thereto, a cover for the receptacle hinged to the receptacle and having an elongated slot, means depending within the receptacle from the cover, a rotatable member mounted on the depending means and engageable by a trolley wire through the said slot, the axis of the rotatable member being below the axis through the pivotal point of the receptacle and a brush to engage with the wire to distribute the fluid coating along the wire.

7. A trolley wire coating device comprising a receptacle to hold a fluid, means to support the receptacle in pivotal relation thereto, a cover for the receptacle having an elongated slot, means depending within the receptacle from the cover, a rotatable member mounted on the depending means and engageable by a trolley wire through the said slot, the axis of the rotatable member being below the axis through the pivotal point of the receptacle and means to limit the pivotal movement of the receptacle.

8. A trolley wire coating device comprising a receptacle to hold a coating fluid, means to support the receptacle in freely pivotal relation to the wire, the pivotal point positioned between the front and rear ends of the receptacle above the center of gravity thereof, a cover for the receptacle provided with an elongated slot through which contact with a trolley wire may be had, means within the receptacle to engage with the trolley wire and the said fluid and deposit the fluid upon the wire, means to limit the pivotal movement of the receptacle and means to distribute the applied fluid uniformly along the wire.

HOMER P. CHANDLER.